US012555817B2

United States Patent
Yi et al.

(10) Patent No.: US 12,555,817 B2
(45) Date of Patent: Feb. 17, 2026

(54) LITHIUM ION BATTERY POSITIVE ELECTRODE MATERIAL, PREPARATION METHOD THEREFOR, AND LITHIUM ION BATTERY

(71) Applicant: BYD COMPANY LIMITED, Shenzhen (CN)

(72) Inventors: Zongwei Yi, Shenzhen (CN); Jinghua Chen, Shenzhen (CN); Wenyu Cao, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 1022 days.

(21) Appl. No.: 17/626,240

(22) PCT Filed: Jul. 8, 2020

(86) PCT No.: PCT/CN2020/100946
§ 371 (c)(1),
(2) Date: Jan. 11, 2022

(87) PCT Pub. No.: WO2021/008423
PCT Pub. Date: Jan. 21, 2021

(65) Prior Publication Data
US 2022/0246978 A1  Aug. 4, 2022

(30) Foreign Application Priority Data

Jul. 15, 2019 (CN) .......................... 201910637198.7

(51) Int. Cl.
*H01M 10/0525* (2010.01)
*H01M 4/02* (2006.01)
(Continued)

(52) U.S. Cl.
CPC ..... *H01M 10/0525* (2013.01); *H01M 4/1391* (2013.01); *H01M 4/362* (2013.01);
(Continued)

(58) Field of Classification Search
CPC ........... H01M 10/0525; H01M 4/1391; H01M 4/362; H01M 4/38; H01M 4/505;
(Continued)

(56) References Cited

U.S. PATENT DOCUMENTS

2013/0130113 A1  5/2013 Takano et al.
2019/0109318 A1  4/2019 Jones et al.
(Continued)

FOREIGN PATENT DOCUMENTS

CN   101145611 A   3/2008
CN   101162776 A   4/2008
(Continued)

OTHER PUBLICATIONS

Park et al. Improved Cycling Stability of Li[Ni0.90Co 0.05Mn0.05]O2 Through Microstructure Modification by Boron Doping for Li-Ion Batteries, Adv. Energy Mater. 2018, 8, 1801202 (Year: 2018).*

(Continued)

*Primary Examiner* — Matthew T Martin
*Assistant Examiner* — Bartholomew A Hornsby
(74) *Attorney, Agent, or Firm* — Wenye Tan

(57) ABSTRACT

A lithium ion battery positive electrode material includes ternary material particles. The ternary material particles are of spherical structures. The spherical structures include petal-like lamella units, and the petal-like lamella units meet at least one of following conditions: the lamella thickness of the petal-like lamella units is 150 to 300 nm; or an area of a surface perpendicular to a direction of the lamella thickness is 60000 to 300000 $nm^2$.

4 Claims, 3 Drawing Sheets

(51) Int. Cl.
*H01M 4/1391* (2010.01)
*H01M 4/36* (2006.01)
*H01M 4/38* (2006.01)
*H01M 4/505* (2010.01)
*H01M 4/525* (2010.01)

(52) U.S. Cl.
CPC ............ *H01M 4/38* (2013.01); *H01M 4/505* (2013.01); *H01M 4/525* (2013.01); *H01M 2004/021* (2013.01); *H01M 2004/028* (2013.01)

(58) Field of Classification Search
CPC ........... H01M 4/525; H01M 2004/021; H01M 2004/028; H01M 4/131; H01M 4/62; H01M 4/36; C01P 2002/52; C01P 2004/03; C01P 2004/61; C01P 2004/80; C01P 2006/12; C01G 53/50; Y02E 60/10
See application file for complete search history.

(56) References Cited

U.S. PATENT DOCUMENTS

| | | | |
|---|---|---|---|
| 2019/0165363 A1 | | 5/2019 | Zhamu et al. |
| 2021/0130189 A1* | | 5/2021 | Chen .................. C01G 53/50 |

FOREIGN PATENT DOCUMENTS

| | | | | | |
|---|---|---|---|---|---|
| CN | 104362305 | A | | 2/2015 | |
| CN | 104701530 | A | * | 6/2015 | ........ H01M 10/0525 |
| CN | 104979545 | A | | 10/2015 | |
| CN | 104979546 | A | | 10/2015 | |
| CN | 105932233 | A | | 9/2016 | |
| CN | 106006762 | A | | 10/2016 | |
| CN | 106058237 | A | | 10/2016 | |
| CN | 106410184 | A | | 2/2017 | |
| CN | 106935824 | A | | 7/2017 | |
| CN | 107394191 | A | | 11/2017 | |
| CN | 107565125 | A | | 1/2018 | |
| CN | 107742721 | A | | 2/2018 | |
| CN | 107895792 | A | | 4/2018 | |
| CN | 108140819 | A | | 6/2018 | |
| CN | 108390060 | A | | 8/2018 | |
| CN | 108807966 | A | | 11/2018 | |
| CN | 109742337 | A | | 5/2019 | |
| CN | 109994726 | A | * | 7/2019 | ............ H01M 4/485 |
| IN | 101891179 | A | | 11/2010 | |
| JP | 2018538663 | A | | 12/2018 | |
| KR | 20170063397 | A | | 6/2017 | |
| WO | 2018117506 | A1 | | 6/2018 | |

OTHER PUBLICATIONS

Kutz et al. (Mechanical Engineers' Handbook Third Edition Materials and Mechanical Design, 2006 by John Wiley & Sons, Inc) (Year: 2006).*
American Elements retrieved from chromeextension://efaidnbmnnnibpcajpcglclefindmkaj/https://www.americanelements.com/images/2024-09/Melting%20Points%20Reference%20Sheet.pdf (Year: 2024).*
The World Intellectual Property Organization (WIPO) International Search Report for PCT/CN2020/100946 Oct. 13, 2020 5 pages (with translation).
Kang-Joon Park et al., Improved Cycling Stability of Li[Ni0.90Co0.05Mn0.05] O2 Through Microstructure Modification by Boron Doping for Li-Ion Batteries, Advanced Energy Materials, vol. 8, No. 25, Jul. 11, 2018, p. 1-9.
Kang-Joon Park et al., High-Capacity Concentration Gradient Li[Ni0.865Co0.120Al0.015] O2 Cathode for Lithium-Ion Batteries, Advanced Energy Materials, vol. 8, No. 19, Jul. 1, 2018, p. 1703612.
Masihhur R. Laskar et al., Atomic Layer Deposition of Al2O3—Ga2O3 Alloy Coatings for Li[Ni0.5Mn0.3Co0.2]O2 Cathode to Improve Rate Performance in Li-Ion Battery, Applied Materials & Interfaces, vol. 8, No. 16, Apr. 2016, pp. 10572-10580.

* cited by examiner

LITHIUM ION BATTERY POSITIVE ELECTRODE MATERIAL, PREPARATION METHOD THEREFOR, AND LITHIUM ION BATTERY

This application is a national phase entry under 35 U.S.C. § 371 of International Application No. PCT/CN2020/100946, filed on Jul. 8, 2020, which claims priority to Chinese Patent Application No. 201910637198.7, filed by the BYD Co., Ltd. on Jul. 15, 2019, and entitled LITHIUM ION BATTERY POSITIVE ELECTRODE MATERIAL AND PREPARATION METHOD THEREFOR, AND LITHIUM ION BATTERY, the entire contents of all of which are incorporated herein by reference.

FIELD

The present disclosure relates to the field of lithium ion batteries, and specifically, to a lithium ion battery positive electrode material, a preparation method therefor, and a lithium ion battery.

BACKGROUND

With the rapid expansion of the lithium ion battery market and the advantages of ternary materials in terms of high specific capacity, the demand for ternary positive electrode materials is increasingly growing. The common particle morphology of current conventional ternary materials is a large single crystal shape and a secondary sphere shape. Different morphologies correspond to different performance characteristics. Corresponding suitable ternary materials with specific morphologies can be selected for different usage scenarios. At present, the production of ternary materials is mainly carried out by a high-temperature solid-phase method. Ternary materials produced by most manufacturers on the market now are in a large single crystal shape and a secondary sphere shape, which are mostly used in the manufacture of power batteries.

However, ternary materials in a single crystal shape and a secondary sphere shape are not applicable to high-current charge-discharge and high-rate charge-discharge processes. Under the above conditions, the ternary materials in a single crystal shape and a secondary sphere shape have the problems of low initial charge-discharge efficiency, poor rate performance, low specific capacity and easy to be affected by low temperatures.

SUMMARY

An objective of the present disclosure is to overcome the problem of poor electrochemical properties of current ternary materials in high-current charge-discharge and high-rate discharge processes of a lithium ion battery, and provide a lithium ion battery positive electrode material, a preparation method therefor, and a lithium ion battery.

To achieve the foregoing objective, according to a first aspect of the present disclosure, a lithium ion battery positive electrode material is provided. The positive electrode material includes ternary material particles, the ternary material particles are of a spherical structure, the spherical structure includes petal-like lamella units, and the petal-like lamella units meet at least one of following conditions: a lamella thickness of the petal-like lamella units is 150 to 300 nm; or an area of a surface perpendicular to a direction of the lamella thickness is 60000 to 300000 $nm^2$.

According to some embodiments of the present disclosure, the positive electrode material meets at least one of following conditions: $D_{10}$ of the ternary material particles is 2000 to 2300 nm; $D_{90}$ of the ternary material particles is 5000 to 6000 nm; $D_{50}$ of the ternary material particles is 3000 to 4000 nm; or a specific surface area is 50000 to 70000 $cm^2/g$.

According to some embodiments of the present disclosure, the ternary material particles contain a ternary active component and a shaping agent, that is, a fixation agent, and the ternary active component contains a substance with a chemical formula as $LiNi_xCo_yMn_{1-x-y}O_2$, $\frac{1}{3}<x<0.9$, and $0.08<y<0.4$.

According to some embodiments of the present disclosure, the shaping agent contains an alloy with a melting point of 650 to 750° C., and the alloy is not eutectic with a precursor of the lithium ion battery positive electrode material and is non-volatile below 1000° C.

According to some embodiments of the present disclosure, the alloy is one or more of a molybdenum alloy, a tungsten alloy, a scandium alloy, a niobium alloy, or dysprosium alloy.

According to some embodiments of the present disclosure, based on a total weight of the ternary material particles, a content of the ternary active component is 98.5 to 99.5 wt % and a content of the shaping agent is 0.5 to 1.5 wt %.

According to a second aspect of the present disclosure, a method for preparing a lithium ion battery positive electrode material is provided, including: mixing a precursor of a lithium ion battery positive electrode material, a lithium source and a shaping agent, and calcining to obtain the positive electrode material, the positive electrode material includes ternary material particles, the ternary material particles are of a spherical structure, the spherical structure includes petal-like lamella units, and the petal-like lamella units meet at least one of the following conditions: the lamella thickness of the petal-like lamella units is 150 to 300 nm; or an area of a surface perpendicular to a direction of the lamella thickness is 60000 to 300000 $nm^2$.

It should be noted that, the description "meet at least one of following conditions" used herein means that any one, any two, any three or all of listed conditions may be met. For example, the description "the petal-like lamella units meet at least one of the following conditions: the lamella thickness of the petal-like lamella units is 150 to 300 nm; or an area of a surface perpendicular to a direction of the lamella thickness is 60000 to 300000 $nm^2$" means that the petal-like lamella units may meet only the condition that the lamella thickness is 150 to 300 nm or meet only the condition that the area of a surface perpendicular to the direction of the lamella thickness is 60000 to 300000 $nm^2$, or simultaneously meet the conditions that the lamella thickness is 150 to 300 nm and the area of a surface perpendicular to the direction of the lamella thickness is 60000 to 300000 $nm^2$. Other similar descriptions in the document have the same meaning as the above, and details are not described again one by one in the following.

According to some embodiments of the present disclosure, the calcining is performed for 14 to 20 hours under a pure oxygen atmosphere at a temperature of 880 to 940° C.

According to some embodiments of the present disclosure, the shaping agent contains an alloy with a melting point of 650 to 750° C., and the alloy is not eutectic with the precursor of the lithium ion battery positive electrode material and is non-volatile below 1000° C.

According to some embodiments of the present disclosure, the alloy is one or more of a molybdenum alloy, a tungsten alloy, a scandium alloy, a niobium alloy, or a dysprosium alloy.

According to some embodiments of the present disclosure, the method further includes: spray granulation on a slurry, and drying for 6 to 10 hours at 150 to 180° C. to obtain the precursor of the lithium ion battery positive electrode material, the slurry contains Ni, Mn, and Co.

According to some embodiments of the present disclosure, the slurry is prepared through the following step (1) or step (2): (1) mixing a Ni-ion containing solution, a Mn-ion containing solution, a Co-ion containing solution, and an additive and reacting to obtain the slurry; or (2) mixing the Ni-ion containing solution, the Mn-ion containing solution, the Co-ion containing solution, and the additive to react, and then adding a doping solution to obtain the slurry, the doping solution contains at least one of Mg ions or Ti ions.

According to some embodiments of the present disclosure, a pH value of the slurry is 10 to 10.5.

According to some embodiments of the present disclosure, a temperature in the mixing is 40 to 60° C. and a time in the mixing is 14 to 20 hours.

According to some embodiments of the present disclosure, based on Ni, Mn and Co, a molar ratio between the Ni-ion containing solution, the Mn-ion containing solution, and the Co-ion containing solution is 1:(0.3-1):(0.3-1).

According to some embodiments of the present disclosure, the additive includes a complexing agent and a precipitating agent, the complexing agent includes aqueous ammonia, and the precipitating agent includes at least one of potassium hydroxide or sodium hydroxide.

According to some embodiments of the present disclosure, the method meets at least one of the following conditions: a molar ratio between the precursor, the lithium source, and the shaping agent is 1:(1-1.15):(0.005-0.015); the lithium source includes one or more of lithium hydroxide monohydrate, lithium carbonate, lithium nitrate, or lithium acetate; a particle size of the shaping agent is 50 to 500 nm; or a particle size of the precursor is 3000 to 4000 nm.

According to a third aspect of the present disclosure, a lithium ion battery is provided. The lithium ion battery includes the lithium ion battery positive electrode material provided according to the first aspect of the present disclosure.

According to the foregoing technical solutions, the positive electrode material of the present disclosure has petal-like lamella units and is of a narrow particle size distribution range and a high specific surface area, so that the positive electrode material has better rate performance, higher initial charge-discharge efficiency and higher specific capacity, and is especially suitable for high-current charge-discharge and high-rate discharge scenarios and other special scenarios.

Other features and advantages of the present disclosure will be described in detail in the following detailed description part.

BRIEF DESCRIPTION OF THE DRAWINGS

The accompanying drawings are intended to provide a further understanding of the present disclosure and constitute a part of this specification. The accompanying drawings and the specific implementations below are used together for explaining the present disclosure rather than constituting a limitation to the present disclosure.

DETAILED DESCRIPTION

Figure 1:
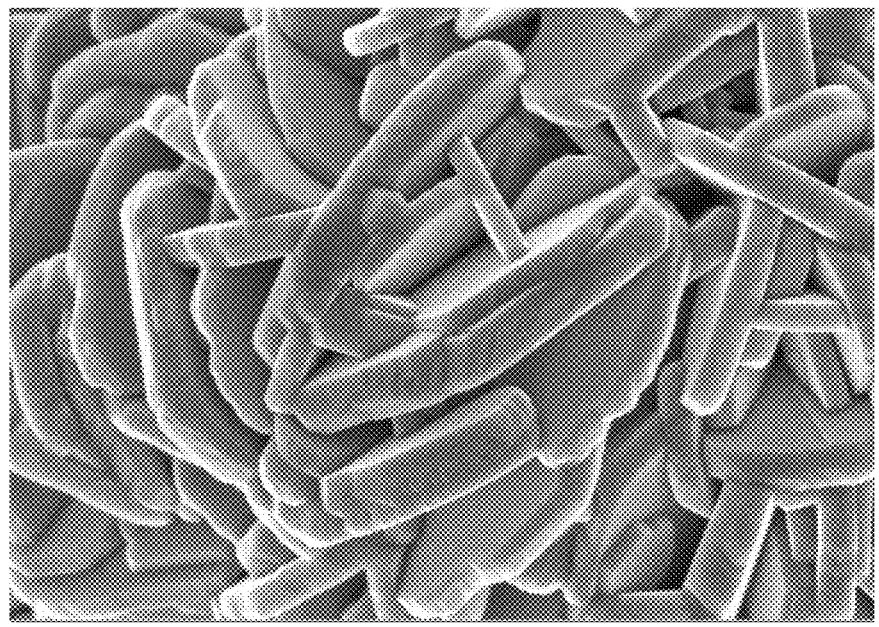
FIG. 1 is a scanning electron microscope (SEM) image (at a magnification of 50K) of a lithium ion battery positive electrode material prepared in Example 1 of the present disclosure.

The following describes the specific implementations of the present disclosure in detail with reference to the accompanying drawings. It should be understood that the specific implementations described herein are merely used to describe and explain the present disclosure, but are not intended to limit the disclosure.

According to a first aspect of the present disclosure, a lithium ion battery positive electrode material is provided. The positive electrode material includes ternary material particles, the ternary material particles are of a spherical structure, and the spherical structure includes petal-like lamella units. The lamella thickness of the petal-like lamella units may be 150 to 300 nm (specifically, for example, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, or 300 nm, etc.). The area of a surface perpendicular to the direction of the lamella thickness may be 60000 to 300000 $nm^2$ (specifically, for example, 60000 $nm^2$, 80000 $nm^2$, 100000 $nm^2$, 150000 $nm^2$, 200000 $nm^2$, 250000 $nm^2$, or 300000 $nm^2$, etc.). The positive electrode material of the present disclosure includes the petal-like lamella units, so that 010 crystal face of the positive electrode material is widely exposed, that is, more crystal faces in the direction of the lamella thickness of the petal-like lamella units are exposed, thereby effectively improving the rate performance, the initial charge-discharge efficiency, and the specific capacity of the positive electrode material, and the positive electrode material is especially suitable for high-current charge-discharge and high-rate discharge scenarios and other special scenarios.

According to some embodiments of the present disclosure, $D_{10}$ of the ternary material particles may be 2000 to 2300 nm (specifically, for example, 2000 nm, 2050 nm, 2100 nm, 2150 nm, 2200 nm, 2250 nm, or 2300 nm, etc.); $D_{90}$ of the ternary material particles may be 5000 to 6000 nm (specifically, for example, 5000 nm, 5100 nm, 5200 nm, 5300 nm, 5400 nm, 5500 nm, 5600 nm, 5700 nm, 5800 nm, 5900 nm, or 6000 nm, etc.); $D_{50}$ of the ternary material particles may be 3000 to 4000 nm (specifically, for example, 3000 nm, 3100 nm, 3200 nm, 3300 nm, 3400 nm, 3500 nm, 3600 nm, 3700 nm, 3800 nm, 3900 nm, or 4000 nm, etc.); the specific surface area may be 50000 to 70000 $cm^2/g$ (specifically, for example, 50000 $cm^2/g$, 55000 $cm^2/g$, 60000 $cm^2/g$, 65000 $cm^2/g$, or 70000 $cm^2/g$, etc.). In some specific embodiments, the $D_{10}$ of the ternary material particles may be 2200 to 2300 nm, the $D_{90}$ of the ternary material particles may be 5200 to 5800 nm, the $D_{50}$ of the ternary material particles may be 3500 to 4500 nm, and the specific surface area may be 50000 to 750000 cm$^2$/g. $D_{10}$ refers to a particle size that a cumulative distribution of particles is 10%, that is, a volume content of particles with particle sizes smaller than this particle size in all particles is 10%. $D_{90}$ refers to a particle size that a cumulative distribution of particles is 90%, that is, a volume content of particles with particle sizes smaller than this particle size in all particles is 90%. $D_{50}$ refers to a corresponding particle size when a cumulative particle size distribution percentage of samples reaches 50%, which indicates that particles with particle sizes larger than this particle size account for 50%, and particles with particle sizes smaller than this particle size also account for 50%. Within the above range, the positive electrode material of the present disclosure can have better rate performance, higher initial charge-discharge efficiency, and higher specific capacity.

According to some embodiments of the present disclosure, the ternary material particles may contain a ternary active component and a shaping agent. The ternary active component may contain a substance with a chemical formula as $LiNi_xCo_yMn_{1-x-y}O_2$, ⅓<x<0.9, and 0.05<y<0.4. According to some embodiments of the present disclosure, the shaping agent may contain an alloy, and the alloy with a melting point of 650 to 750° C. (specifically, for example, 650° C., 660° C., 670° C., 680° C., 690° C., 700° C., 710° C., 720° C., 730° C., 740° C., or 750° C., etc.), is not eutectic with a precursor of the lithium ion battery positive electrode material and is non-volatile below 1000° C. In some specific embodiments, the alloy may be one or more of a molybdenum alloy, a tungsten alloy, a scandium alloy, a niobium alloy, or a dysprosium alloy, and may be specifically the molybdenum alloy. The molybdenum alloy is a non-ferrous alloy formed by adding other elements to base molybdenum. Main alloy elements added to the molybdenum alloy are titanium, zirconium, hafnium, tungsten and rare earth elements.

According to some embodiments of the present disclosure, a content of the ternary active component may be varied within a relatively large range. In some specific embodiments, based on a total weight of the ternary material particles, the content of the ternary active component may be 98.5 to 99.5 wt % (specifically, for example, 98.5 wt %, 98.6 wt %, 98.7 wt %, 98.8 wt %, 98.9 wt %, 99 wt %, 99.1 wt %, 99.2 wt %, 99.3 wt %, 99.4 wt %, or 99.5 wt %, etc.), and a content of the shaping agent may be 0.5 to 1.5 wt % (specifically, for example, 0.5 wt %, 0.8 wt %, 1 wt %, 1.2 wt %, or 1.5 wt %, etc.). In some other specific embodiments, based on the total weight of the ternary material particles, the content of the ternary active component may be 98.5 to 99 wt %, and the content of the shaping agent may be 0.5 to 1 wt %. Within above content ranges, a ratio of the ternary active component to the shaping agent is proper, and the positive electrode material has petal-like lamella units with a better structure, thereby further improving the rate performance, the initial charge-discharge efficiency, and the specific capacity of the positive electrode material, so that the positive electrode material also has better electrochemical performance in high-current charge-discharge and high-rate discharge scenarios and other special scenarios.

According to a second aspect of the present disclosure, a method for preparing a lithium ion battery positive electrode material is provided, including: mixing a precursor of a lithium ion battery positive electrode material, a lithium source, and a shaping agent, and calcining to obtain the positive electrode material, the positive electrode material includes ternary material particles, the ternary material particle are of a spherical structure, and the spherical structure includes petal-like lamella units. The lamella thickness of the petal-like lamella unit may be 150 to 300 nm (specifically, for example, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, or 300 nm, etc.). The area of a surface perpendicular to the direction of the lamella thickness may be 60000 to 300000 nm$^2$ (specifically, for example, 60000 nm$^2$, 80000 nm$^2$, 100000 nm$^2$, 150000 nm$^2$, 200000 nm$^2$, 250000 nm$^2$, or 300000 nm$^2$, etc.). Through the method of the present disclosure, the positive electrode material including petal-like lamella units can be prepared. The positive electrode material has high rate performance, initial charge-discharge efficiency, and specific capacity, and is especially suitable for high-current charge-discharge and high-rate discharge scenarios and other special scenarios.

According to some embodiments of the present disclosure, the precursor of the lithium ion battery positive electrode material, the lithium source, and the shaping agent may be mixed by a method conventionally used by those skilled in the art. For example, a mechanical mixing method may be used, and a stirring rate may be selected according to requirements, for example, 200 to 600 r/min (specifically, for example, 200 r/min, 300 r/min, 400 r/min, 500 r/min, or 600 r/min).

According to some embodiments of the present disclosure, the calcining may be performed for 14 to 20 hours (specifically, for example, 14 h, 15 h, 16 h, 17 h, 18 h, 19 h, or 20 h, etc.) under a pure oxygen atmosphere at a temperature of 880 to 940° C. (specifically, for example, 880° C., 890° C., 900° C., 910° C., 920° C., 930° C., or 940° C., etc.). In some specific embodiments, the calcining is performed for 18 to 20 hours at a temperature of 920 to 940° C. The calcining may be performed in a device conventionally used by those skilled in the art such as a tube furnace. After the calcining under the foregoing conditions, the positive electrode material can have a more stable structure and a better surface morphology, thereby further improving the electrochemical performance of the positive electrode material.

According to some embodiments of the present disclosure, the shaping agent may contain an alloy, and the alloy with a melting point of 650 to 750° C. is not eutectic with the precursor of the lithium ion battery positive electrode material and is non-volatile below 1000° C., for example, is non-volatile at 950 to 1000° C. The alloy may be one or more of a molybdenum alloy, a tungsten alloy, a scandium alloy, a niobium alloy, or a dysprosium alloy, and may be specifically the molybdenum alloy. During preparation, a thin film may be formed on a surface of the precursor by using the shaping agent, which has an effect of shaping and protection on the morphology of the precursor, so that the positive electrode material prepared has good petal-like lamella units, thereby further improving the electrochemical performance of the lithium ion battery positive electrode material.

According to some embodiments of the present disclosure, the precursor of the lithium ion battery positive electrode material may be a precursor conventionally used by those skilled in the art, for example, a precursor of a nickel-cobalt-manganese ternary material. The method for preparing the precursor is not limited herein and may be conventionally used by those skilled in the art. In some specific embodiments, the method for preparing a lithium ion battery positive electrode material may further include: performing spray granulation on a slurry, and drying for 6 to 10 hours (specifically, for example, 6 h, 7 h, 8 h, 9 h, or 10 h, etc.) at 150 to 180° C. (specifically, for example, 150° C., 160° C., 170° C., or 180° C., etc.) to obtain the precursor of the lithium ion battery positive electrode material, the slurry contains Ni, Mn, and Co. The spray granulation may be performed in a device conventionally used by those skilled in the art, for example, a spray granulator or an ultrasonic atomizer may be used. In some specific embodiments, an ultrasonic atomizer is used for spray granulation with an oscillation frequency of 5000 to 10000 MHz (specifically, for example, 5000 MHz, 6000 MHz, 7000 MHz, 8000 MHz, 9000 MHz, or 10000 MHz, etc.). Specifically, nitrogen or an inert gas may be used as a carrier gas, and atomized particles are introduced into a dryer or a drying oven for drying. A drying temperature is not specifically limited and may be selected according to an actual requirement.

According to some embodiments of the present disclosure, a solution containing Ni ions, a solution containing Mn ions, a solution containing Co ions, and an additive may be mixed to obtain the slurry. The solution containing Ni ions, the solution containing Mn ions, and the solution containing Co ions may be respectively prepared by dissolving a Ni salt, a Mn salt, and a Co salt in solvents. For example, $NiCl_2 \cdot 6H_2O$, $MnCl_2 \cdot 4H_2O$, and $CoCl_2 \cdot 6H_2O$ may be respectively dissolved in solvents such as deionized water to prepare the solution containing Ni ions, the solution containing Mn ions, and the solution containing Co ions. A specific manner of mixing the solution containing Ni ions, the solution containing Mn ions, the solution containing Co ions, and the additive is not limited, as long as various components are uniformly mixed. In some specific embodiments, a peristaltic pump may be used to control feeding quantities of the solution containing Ni ions, the solution containing Mn ions, the solution containing Co ions, and the additive.

In a specific implementation, the solution containing Ni ions, the solution containing Mn ions, the solution containing Co ions, and the additive may be mixed to react, and then a doping solution is added to obtain the slurry, to further improve the electrochemical performance of the prepared lithium ion battery positive electrode material. The doping solution may contain at least one of Mg ions or Ti ions. For example, the doping solution may be at least one of a $MgCl_2$ solution or a $TiCl_4$ solution. The manner of adding the doping solution is not limited. For example, the doping solution may be added dropwise to the solution after the mixing and reaction gradually, and stirring is performed to make the various components uniformly mixed. The adding amount of the doping solution may be selected according to requirements. For example, based on a total weight of Ni, Mn, Co and doping elements, a content of the doping elements may be 0.1 to 0.3 wt % (specifically, for example, 0.1 wt %, 0.15 wt %, 0.2 wt %, 0.25 wt %, or 0.3 wt %, etc.). It should be noted that, "Mg ions and/or Ti ions" may be used interchangeably with "at least one of Mg ions or Ti ions" herein. Other similar descriptions have the same meaning as the above, and details are not described again one by one in the following.

According to some embodiments of the present disclosure, a pH value of the slurry, a mixing temperature, and a time may be varied within a relatively large range. For example, the pH value of the slurry may be 10 to 10.5 (specifically, for example, 10, 10.1, 10.2, 10.3, 10.4, or 10.5, etc.), and the mixing temperature may be 40 to 60° C. (40° C., 45° C., 50° C., 55° C., or 60° C., etc.), and the time may be 14 to 20 hours (specifically, for example, 14 h, 15 h, 16 h, 17 h, 18 h, 19 h, or 20 h, etc.). In some specific embodiments, the pH value of the slurry may be 10.1 to 10.4, the mixing temperature may be 40 to 50° C., and the time may be 18 to 20 hours. Within ranges of the foregoing conditions, reaction components can fully react and form the positive electrode material with a specific morphology and structure, so as to further improve the electrochemical performance of the prepared lithium ion battery positive electrode material.

According to some embodiments of the present disclosure, based on Ni, Mn and Co, the molar ratio of the solution containing Ni ions, the solution containing Mn ions, and the solution containing Co ions may be 1:(0.3-1):(0.3-1), specifically, for example, 1:0.3:0.3, 1:0.5:0.3, 1:0.8:0.3, 1:1:0.3, 1:0.3:0.5, 1:0.3:0.8, or 1:0.3:1, etc. Within foregoing ratio ranges, the positive electrode material with a proper ratio of Ni, Mn and Co can be prepared.

In a specific implementation, a co-precipitation method is used in the present disclosure to prepare the lithium ion battery positive electrode material. The additive may include a complexing agent and a precipitating agent. The complexing agent and the precipitating agent are well known to those skilled in the art. For example, the complexing agent may be aqueous ammonia, and the precipitating agent may include at least one of potassium hydroxide or sodium hydroxide.

According to some embodiments of the present disclosure, a molar ratio between the precursor of the lithium ion battery positive electrode material, the lithium source, and the shaping agent may be 1:(1-1.15):(0.005-0.015), specifically, may be 1:(1.1-1.15):(0.01-0.015), for example, 1:1.1:0.01, 1:1.12:0.01, 1:1.15:0.01, 1:1.1:0.012, or 1:1.1:0.015, etc. The lithium source may be at least one of nanoscale lithium hydroxide and battery-grade lithium hydroxide. A type of the lithium source may be conventionally used by those skilled in the art, and may be specifically one or more of lithium hydroxide, lithium carbonate, lithium nitrate, or lithium nitrate. The particle size of the shaping agent may be 50 to 500 nm (specifically, for example, 50 nm, 100 nm, 150 nm, 200 nm, 250 nm, 300 nm, 350 nm, 400 nm, 450 nm, or 500 nm, etc.). The particle size of the precursor of the lithium ion battery positive electrode material may be 3000 to 4000 nm (specifically, for example, 3000 nm, 3100 nm, 3200 nm, 3300 nm, 3400 nm, 3500 nm, 3600 nm, 3700 nm, 3800 nm, 3900 nm, or 4000 nm, etc.). Within above ranges, the positive electrode material with better rate performance, higher initial charge-discharge efficiency, and higher specific capacity can be prepared.

In a specific implementation, a coating material may be used for surface coating of the positive electrode material. The coating material may be selected from one or more of $ZrO_2$, $Al_2O_3$, $TiO_2$, or C to avoid a problem of gas production at a high temperature during use of the positive electrode material. The coating may be performed in a NOB mechanical fusion machine, and specific operation parameters may be selected according to actual requirements. For example, materials may be stirred and fused in the mechanical fusion machine for 10 to 40 min (specifically, for example, 10 min, 15 min, 20 min, 25 min, 30 min, 35 min, or 40 min, etc.), and a product after stirring and fusion is collected and subjected to heat treatment at 200 to 400° C. (specifically, for example, 200° C., 250° C., 300° C., 350° C., or 400° C., etc.) for 3 to 10 h (specifically, for example, 3 h, 4 h, 5 h, 6 h, 7 h, 8 h, 9 h, or 10 h, etc.). A product after the heat treatment is dried and dewatered to reduce a moisture of the product to below 1000 ppm, to obtain a final product. An amount of the coating material may be varied in a relatively large range. Specifically, based on a total weight of the positive electrode material, the amount of the coating material may be 0.05 to 0.3 wt % (specifically, for example, 0.05 wt %, 0.1 wt %, 0.15 wt %, 0.2 wt %, 0.25 wt %, or 0.3 wt %, etc.). An average particle size of particles of the coating material may be 50 to 500 nm (specifically, for example, 50 nm, 100 nm, 150 nm, 200 nm, 250 nm, 300 nm, 350 nm, 400 nm, 450 nm, or 500 nm, etc.).

According to a third aspect of the present disclosure, a lithium ion battery is provided. The lithium ion battery includes the lithium ion battery positive electrode material provided according to the first aspect of the present disclosure. The lithium ion battery of the present disclosure has good rate performance, initial charge-discharge efficiency, and specific capacity, and is especially suitable for high-current charge-discharge and high-rate discharge scenarios and other special scenarios.

The lithium ion battery of the present disclosure further includes a positive electrode, a negative electrode, a separator, and an electrolyte. The positive electrode contains the positive electrode material of the present disclosure. The negative electrode, the separator, and the electrolyte are well known to those skilled in the art, and details are not described herein again. The lithium ion battery may be prepared by a method conventionally used by those skilled in the art. The specific form of the lithium ion battery is not limited as well. For example, the lithium ion battery may be a soft pack battery or a button battery.

The present disclosure is further illustrated through the following examples, but the present disclosure is not limited thereby.

$NiCl_2 \cdot 6H_2O$, $MnCl_2 \cdot 4H_2O$, and $CoCl_2 \cdot 6H_2O$ are separately dissolved in deionized water to prepare 2 mol/L solutions for use. NaOH is dissolved in deionized water to prepare a 4 mol/L precipitating agent for use. 4 mol/L aqueous ammonia is prepared as a complexing agent for use. A 0.2 mol/L $MgCl_2$ solution or a 0.2 mol/L $TiCl_4$ solution is prepared as a doped solution for use.

Example 1

At the start of a co-precipitation reaction, aqueous ammonia was first added into deionized water as the complexing agent, and then a reaction feed liquid and a precipitating agent were added by using a peristaltic pump, the precipitating agent was a 4 mol/L sodium hydroxide solution. Flows of a $NiCl_2$ solution, a $MnCl_2$ solution, and a $CoCl_2$ solution were controlled according to an addition rate of 3:1:1, and were put into a reactor to react by stirring and mixing after passing through a regulating valve and a flowmeter. Amounts of the precipitating agent and the complexing agent were controlled to adjust a pH value of solution to 10.5, and the stirring temperature was controlled to a constant temperature of 40° C. After 2 h of stirring, 20 mL of a doping solution was added dropwise into reaction solution every 1 hour for a total of 6 times. The final adding amount of doping elements was 0.2 wt %, and the stirring reaction lasted for a total of 14 h.

After the stirring reaction was completed, the solution was atomized and granulated by an ultrasonic atomizer with an oscillation frequency of 10000 MHz, and atomized droplets were introduced into a dryer by using nitrogen as a carrier gas to be dried at 150° C. for 7 hours. Powder at a discharging port was collected to obtain $[NiCoMn]OH_2$ hydroxide containing the doping elements, and then a precursor was obtained after gas crushing.

The precursor, lithium carbonate, and molybdenum alloy (with a melting point of 650 to 750° C.) in a molar ratio of 1:0.4:0.01 were uniformly mixed in a high-speed mixer, and then put into a tube furnace to undergo high-temperature calcining under a pure oxygen atmosphere at 880° C. for 8 h. A material after primary calcining was gas crushed and sieved to disperse particles, a lithiation rate was detected, and then an amount of lithium carbonate that required to be supplemented was calculated to achieve a lithiation rate of Li/M=1.05. Materials were uniformly mixed and then put into the tube furnace to undergo high-temperature calcining under a pure oxygen atmosphere at 940° C. for 6 h. Secondary gas crushing was performed to disperse particles.

Surface coating was performed on a gas crushed product by using a NOB mechanical fusion machine. Nanoscale $ZrO_2$ was selected as a coating agent with an adding amount of 0.3 wt %. After stirred and fused in the fusion machine for 15 min, a product was collected and subjected to heat treatment at 300° C. for 5 h. The product was dried at 105° C. for 5 h in an oven for dewatering to reduce a powder moisture to below 1000 ppm to obtain a positive electrode material.

Example 2

At the start of a co-precipitation reaction, aqueous ammonia was first added into deionized water as the complexing agent, and then a reaction feed liquid and a precipitating agent were added by using a peristaltic pump, the precipitating agent was 4 mol/L sodium hydroxide solution. Flows of the $NiCl_2$ solution, the $MnCl_2$ solution, and the $CoCl_2$ solution were controlled according to an addition rate of 3:1:1, and were put into a reactor to react by stirring and mixing after passing through a regulating valve and a flowmeter. Amounts of the precipitating agent and the complexing agent were controlled to adjust the pH value of the solution to 10.5, and the stirring temperature was controlled to a constant temperature of 60° C. After 2 h of stirring, 20 mL of a doping solution was added dropwise into the reaction solution every 2 hour for a total of 6 times. The final adding amount of doping elements was 0.2 wt %, and the stirring reaction lasted for a total of 14 h.

After the stirring reaction was completed, the solution was atomized and granulated by using an ultrasonic atomizer with an oscillation frequency of 10000 MHz, and atomized droplets were introduced into a dryer at 160° C. for 6 h by using nitrogen as a carrier gas. Powder at a discharging port was collected to obtain $[NiCoMn]OH_2$ hydroxide containing the doping elements, and then gas crushed to obtain a precursor.

The precursor, lithium carbonate, and molybdenum alloy in a molar ratio of 1:0.4:0.01 were uniformly mixed in a high-speed mixer, and then put into a tube furnace to undergo high-temperature calcining under a pure oxygen atmosphere at 880° C. for 8 h. A material after primary calcining was gas crushed and sieved to disperse particles, a lithiation rate was detected, and then an amount of lithium carbonate that required to be supplemented was calculated to achieve a lithiation rate of Li/M=1.05. Materials were uniformly mixed and then put into the tube furnace to undergo high-temperature calcining under a pure oxygen atmosphere at 940° C. for 6 h. Secondary gas crushing was performed to disperse particles.

Surface coating was performed on the gas crushed product by using a NOB mechanical fusion machine. Nano-scale $ZrO_2$ was selected as a coating agent with an adding amount of 0.3 wt %. After stirred and fused in the fusion machine for 15 min, the product was collected and subjected to heat treatment at 300° C. for 5 h. The product was dried at 105°

C. for 5 h in an oven for dewatering to reduce the powder moisture to below 1000 ppm to obtain a positive electrode material.

Example 3

A precursor was prepared by using the same method as Example 1. The difference only lies in that the precursor, lithium carbonate, and tungsten alloy (with a melting point of 910 to 940° C.) in a molar ratio of 1:0.4:0.01 were uniformly mixed in a high-speed mixer, and then put into a tube furnace to undergo high-temperature calcining under a pure oxygen atmosphere at 940° C. for 14 h.

Example 4

A precursor was prepared by using the same method as Example 1. The difference only lies in that the precursor, lithium carbonate, and molybdenum alloy in a molar ratio of 1:0.4:0.005 were uniformly mixed in a high-speed mixer, and then put into a tube furnace to undergo high-temperature calcining under a pure oxygen atmosphere at 880° C. for 8 h. A material after primary calcining was gas crushed and sieved, a lithiation rate was detected, and then an amount of lithium carbonate that required to be supplemented was calculated to achieve a lithiation rate of Li/M=1.05. Materials were uniformly mixed and then put into the tube furnace to undergo high-temperature calcining under a pure oxygen atmosphere at 940° C. for 6 h, and then secondary gas crushing was performed.

Example 5

A positive electrode material was prepared by using the same method as Example 1. The difference only lies in that the pH value of the solution was 7.5, the stirring temperature was controlled to a constant temperature of 30° C., and the stirring reaction lasted for total 20 h.

Comparative Example 1

A precursor was prepared by using the same method as Example 1. The difference only lies in that the precursor and lithium carbonate in a molar ratio of 1:0.4 were uniformly mixed in a high-speed mixer, and then put into a tube furnace to undergo high-temperature calcining in a pure oxygen atmosphere at 880° C. for 8 h. A material after primary calcining was gas crushed and sieved to disperse particles, a lithiation rate was detected, and then an amount of lithium carbonate that required to be supplemented was calculated to achieve a lithiation rate of Li/M=1.05. The materials were uniformly mixed and then put into the tube furnace to undergo high-temperature calcining in a pure oxygen atmosphere at 940° C. for 6 h. Secondary gas crushing was performed to disperse particles to obtain a positive electrode material.

Comparative Example 2

Under an oxygen atmosphere, a ternary precursor (commercially available, produced by Huayou Cobalt, discontinuous method NCM60/20/20_Y622D-H) in a molar ratio of 1:0.53 was mixed with lithium carbonate, and then sintered under a pure oxygen atmosphere at 920° C. for 14 h. Gas crushing was performed on the sintered product, and surface coating was performed on the gas crushed product by using a NOB mechanical fusion machine. Nano-scale $ZrO_2$ was selected as a coating agent with an adding amount of 0.3 wt %. After stirred and fused in the fusion machine for 15 min, the product was collected and subjected to heat treatment at 300° C. for 5 h. The product was dried at 105° C. for 5 h in an oven for dewatering to reduce the powder moisture to below 1000 ppm to obtain a positive electrode material.

Test Examples (1) SEM Test

Figure 2:
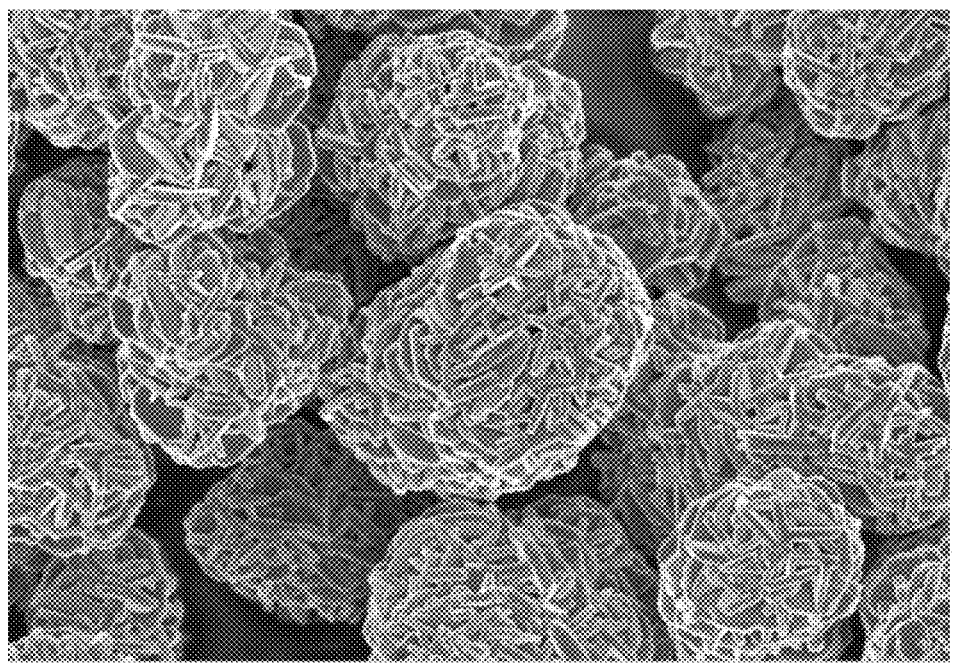
FIG. 2 is an SEM image (at a magnification of 10K) of a lithium ion battery positive electrode material prepared in Example 1 of the present disclosure.
Figure 3:
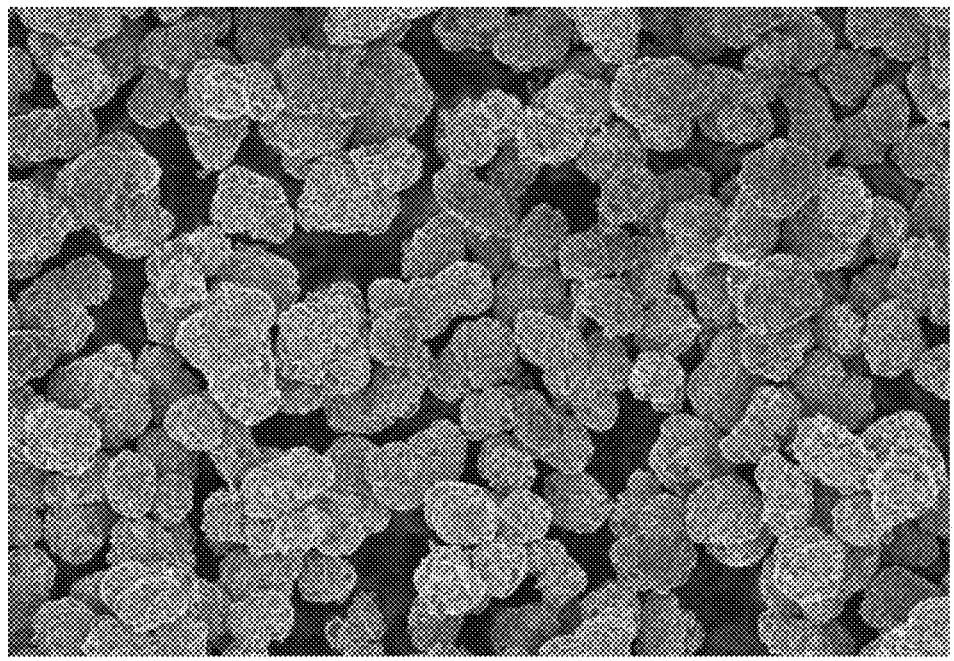
FIG. 3 is an SEM image (at a magnification of 3K) of a lithium ion battery positive electrode material prepared in Example 1 of the present disclosure.
Figure 4:
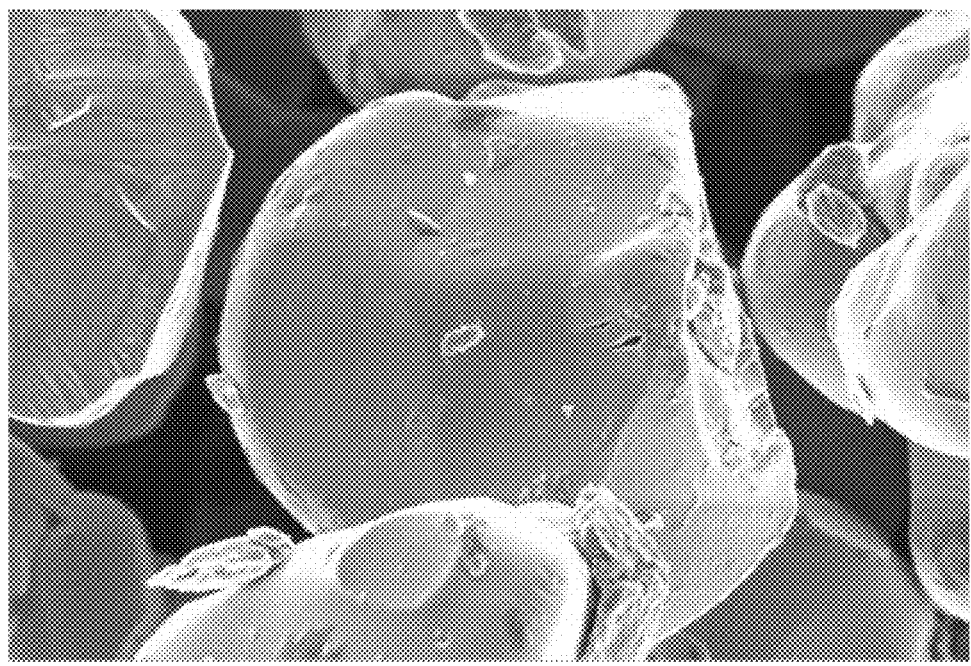
FIG. 4 is an SEM image (at a magnification of 50K) of a lithium ion battery positive electrode material prepared in Comparative Example 1 of the present disclosure.
Figure 5:
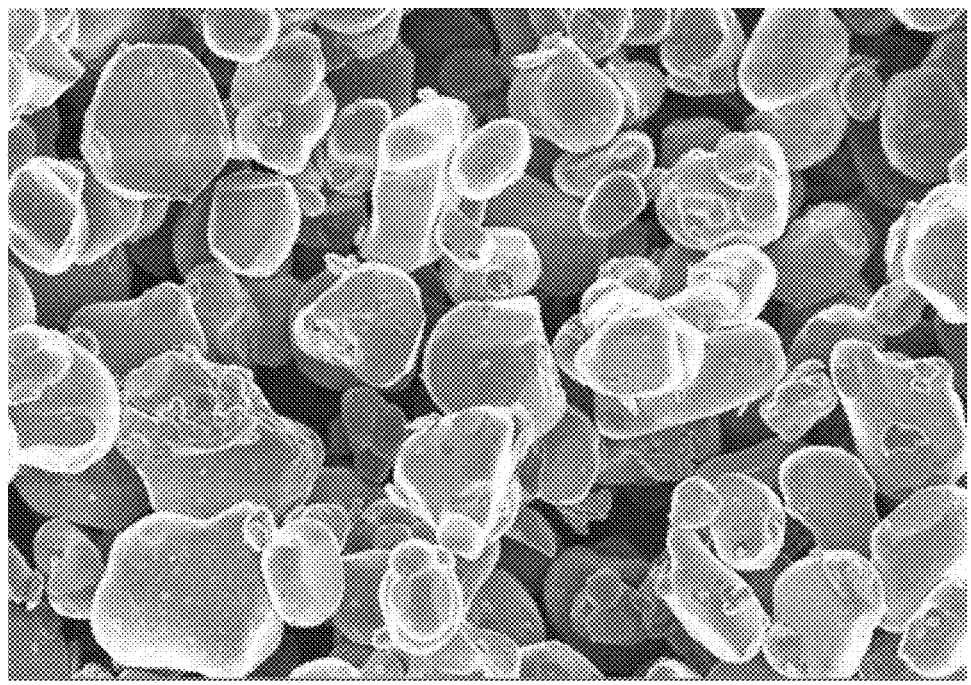
FIG. 5 is an SEM image (at a magnification of 10K) of a lithium ion battery positive electrode material prepared in Comparative Example 1 of the present disclosure.
Figure 6:
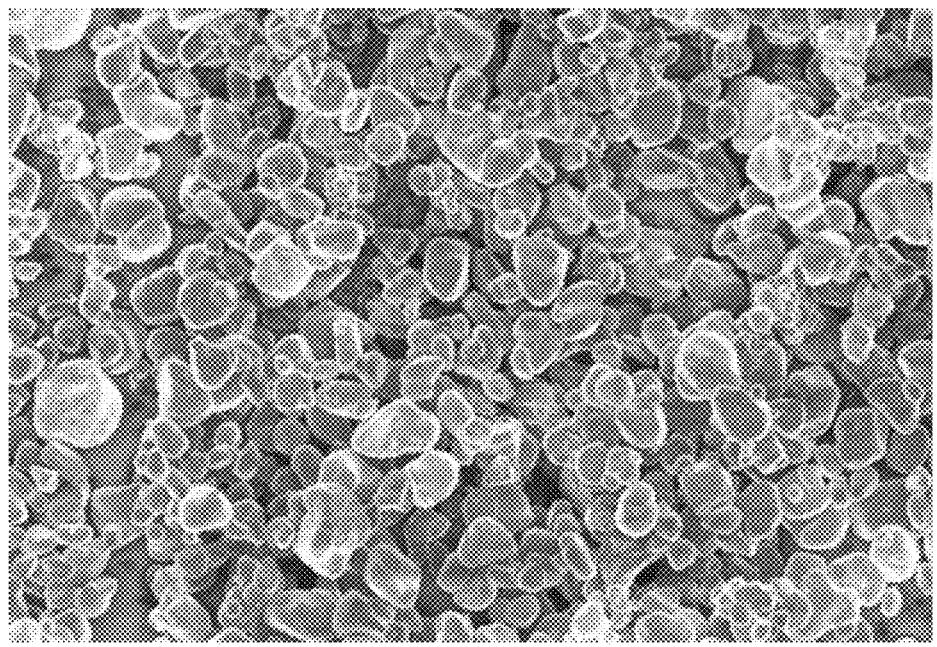
FIG. 6 is an SEM image (at a magnification of 3K) of a lithium ion battery positive electrode material prepared in Comparative Example 1 of the present disclosure.

The microscopic morphology of the positive electrode material powder was observed by using a scanning electron microscope (SEM) of a model JSM-7800 produced by Japan Incorporation with a scanning voltage of 5 KV and magnifications of 3K×, 10K×, and 50K×. The powder sample was sticked on a conductive tape and then conductively coated, and then the sample was dried and stored in a vacuum drying oven before the test. SEM images of the positive electrode material obtained in Example 1 at different magnifications are respectively shown in FIG. 1 to FIG. 3, and SEM images of the positive electrode material obtained in Comparative Example 1 at different magnifications are respectively shown in FIG. 4 to FIG. 6. By comparing FIG. 1 to FIG. 3 with FIG. 4 to FIG. 6, it can be learned that the positive electrode material prepared in the example of the present disclosure has a spherical structure, and the spherical structure has obvious petal-like lamella units, while the positive electrode material obtained in the comparative example does not have petal-like lamella units.

(2) Specific Surface Area Test

A specific surface area of the positive electrode material powder was determined by a Brunauer-Emmett-Teller (BET) multipoint method using a specific surface and pore analyzer of a model 3H-3000PS2 produced by Beishide Instrument Technology Co., Ltd.

(3) Malvern Particle Size Test

A particle size distribution of the positive electrode material was tested by using a Mastersizer 3000.

(4) Battery Preparation and Electrochemical Performance Test

An active substance (that is, the positive electrode material), a conductive agent (0.5CNT+0.5GN), and polyvinylidene difluoride (PVDF) were added to a specific amount of N-methyl pyrrolidone (NMP) in a mass ratio of 100:3:3 and then mixed uniformly. The mixture was pressed into a wafer as a positive electrode after dried under vacuum at 110° C., a metal lithium plate was used as a negative electrode, a Celgard 2300 microporous film was used as a separator, and 1 mol/L $LiPF_6$/ethylene carbonate (EC)+ dimethyl carbonate (DMC) (with a volume ratio of 1:1) was used as an electrolyte, to be assembled into an 82016 button battery in a glove box. A Xinwei 3008 battery test system was used for a charge-discharge cycle test with a test condition of 25° C. room temperature. Test results are shown in Table 1 and Table 2.

TABLE 1

| Item | $D_{10}$ (nm) | $D_{50}$ (nm) | $D_{90}$ (nm) | Specific surface area (cm²/g) | Lamella thickness (nm) | Area of surface perpendicular to direction of thickness (nm²) |
|---|---|---|---|---|---|---|
| Example 1 | 2300 | 3700 | 5500 | 64561 | 180 | 60000 |
| Example 2 | 2300 | 3400 | 5100 | 30554 | 300 | 100000 |
| Example 3 | 2000 | 5200 | 12000 | 57000 | 240 | 88000 |

TABLE 1-continued

| Item | $D_{10}$ (nm) | $D_{50}$ (nm) | $D_{90}$ (nm) | Specific surface area (cm$^2$/g) | Lamella thickness (nm) | Area of surface perpendicular to direction of thickness (nm$^2$) |
|---|---|---|---|---|---|---|
| Example 4 | 2300 | 3300 | 5600 | 61548 | 200 | 80000 |
| Example 5 | 2300 | 3600 | 6000 | 59467 | 220 | 84000 |
| Comparative Example 1 | 2000 | 5200 | 12000 | 8294 | / | / |
| Comparative Example 2 | 2000 | 9800 | 13000 | 13191 | / | / |

TABLE 2

| Item | Initial charge-discharge efficiency (%) | Specific capacity (mAh/g) | 5 C/0.2 C rate (%) |
|---|---|---|---|
| Example 1 | 92.5 | 195 | 92 |
| Example 2 | 90 | 192 | 90 |
| Example 3 | 91 | 192 | 88 |
| Example 4 | 91 | 193 | 89 |
| Example 5 | 90 | 192 | 90 |
| Comparative Example 1 | 83 | 178 | 80 |
| Comparative Example 2 | 84 | 181 | 82 |

From the above data, it can be learned that, compared with a battery using the positive electrode material in the comparative examples, the initial charge-discharge efficiency, specific capacity, and rate performance of a battery using the positive electrode material in the examples of the present disclosure are all significantly improved, which indicates that the positive electrode material of the present disclosure can effectively improve the rate performance, initial charge-discharge efficiency, and specific capacity of a positive electrode material. Furthermore, by comparing Comparative Example 2 with the examples, it can be learned that through the method of the present disclosure, a positive electrode material having petal-like lamella units with a proper lamella thickness and area can be effectively prepared. However, according to the method in Comparative Example 2, the material is agglomerate during preparation, so that a positive electrode material having petal-like lamella units cannot be effectively prepared, and the rate performance, initial charge-discharge efficiency, and specific capacity of the obtained positive electrode material are obviously worse than those of the positive electrode material obtained in the examples.

The preferred implementations of the present disclosure are described in detail above with reference to the accompanying drawings. However, the present disclosure is not limited to the specific details in the foregoing implementations, a plurality of simple deformations may be made to the technical solution of the present disclosure within a range of the technical concept of the present disclosure, and these simple deformations fall within the protection scope of the disclosure.

Additionally, it should be noted that, the specific technical features described in the above specific implementations may be combined in any suitable manner without contradiction. To avoid unnecessary repetition, various possible combinations are not further described in the present disclosure.

In addition, different implementations of the disclosure may also be arbitrarily combined without departing from the idea of the disclosure, and these combinations shall still be regarded as content disclosed in the disclosure.

What is claimed is:

1. A lithium ion battery positive electrode material, comprising ternary material particles; wherein the ternary material particles are of a spherical structure, the spherical structure comprises petal-like lamella units, and the petal-like lamella units meet following conditions:
 a lamella thickness of the petal-like lamella units is 150 to 300 nm; and
 an area of a surface perpendicular to a direction of the lamella thickness is 60000 to 300000 nm$^2$;
 wherein the ternary material particles comprise a ternary active component and a fixation agent, being an alloy of one or more of a molybdenum alloy, a tungsten alloy, a scandium alloy, a niobium alloy, or a dysprosium alloy, and the ternary active component comprises a substance with a chemical formula as $LiNi_xCo_yMn_{1-x-y}O_2$; and wherein $\frac{1}{3}<x<0.9$, and $0.08<y<0.4$; and
 wherein the fixation agent alloy has a melting point of 650 to 750° C., and the alloy is not eutectic with a precursor of the lithium ion battery positive electrode material and is non-volatile below 1000° C.

2. The positive electrode material of claim 1, meeting at least one of following conditions:
 $D_{10}$ of the ternary material particles is 2000 to 2300 nm;
 $D_{90}$ of the ternary material particles is 5000 to 6000 nm;
 $D_{50}$ of the ternary material particles is 3000 to 4000 nm; or
 a specific surface area of the ternary material particles is 50000 to 70000 cm$^2$/g.

3. The positive electrode material of claim 1, wherein based on a total weight of the ternary material particles, a content of the ternary active component is 98.5 to 99.5 wt % and a content of the fixation agent is 0.5 to 1.5 wt %.

4. A lithium ion battery, comprising the lithium ion battery positive electrode material, the lithium ion battery positive electrode material comprising ternary material particles, wherein:
 the ternary material particles are of a spherical structure,
 the spherical structure comprises petal-like lamella units, and
 the petal-like lamella units meet following conditions:
 a lamella thickness of the petal-like lamella units is 150 to 300 nm; and
 an area of a surface perpendicular to a direction of the lamella thickness is 60000 to 300000 nm$^2$;
 wherein the ternary material particles comprise a ternary active component and a fixation agent, being an alloy of one or more of a molybdenum alloy, a tungsten alloy, a scandium alloy, a niobium alloy, or a dysprosium alloy, and the ternary active component comprises a substance with a chemical formula as $LiNi_xCo_yMn_{1-x-y}O_2$; and wherein $\frac{1}{3}<x<0.9$, and $0.08<y<0.4$, and
 wherein the fixation agent alloy has a melting point of 650 to 750° C., and the alloy is not eutectic with a precursor of the lithium ion battery positive electrode material and is non-volatile below 1000° C.

* * * * *